W. T. ROGERS.

Gang Plow.

No. 56,613.

2 Sheets—Sheet 1.

Patented July 24, 1866.

Witnesses
Alex. A. C. Klaucke,
W. F. Hall.

Inventor:
W. T. Rogers
By Munn & Co.
Attys.

W. T. ROGERS.
Gang Plow.
No. 56,613.
Patented July 24, 1866.
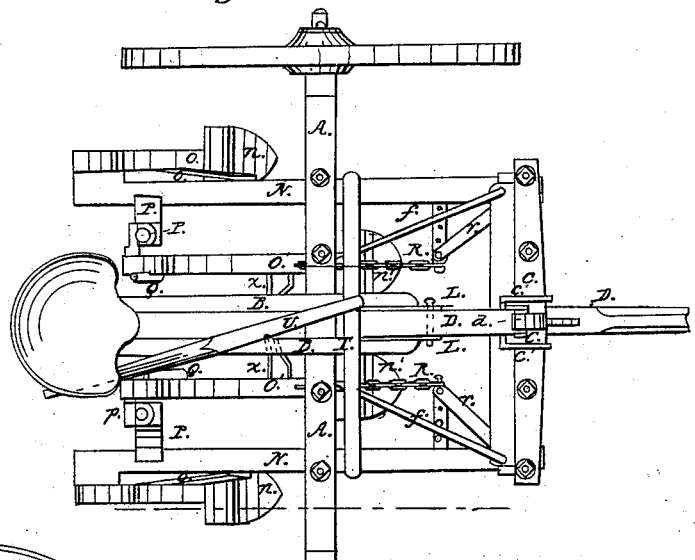
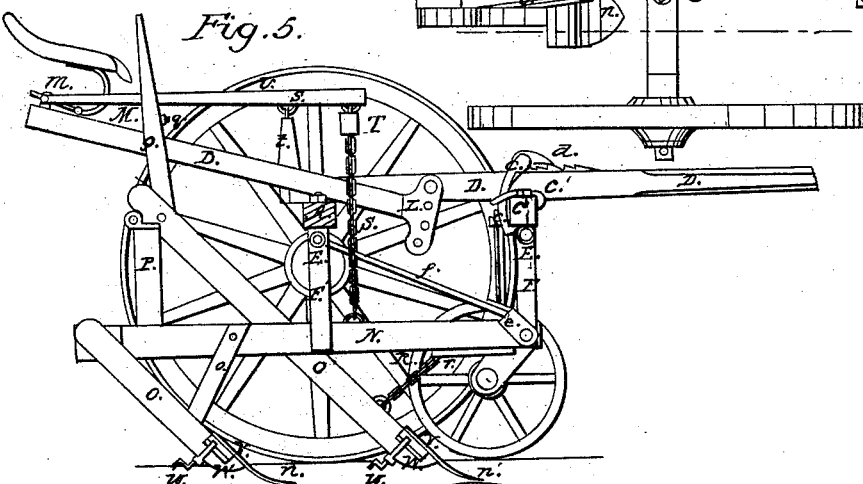
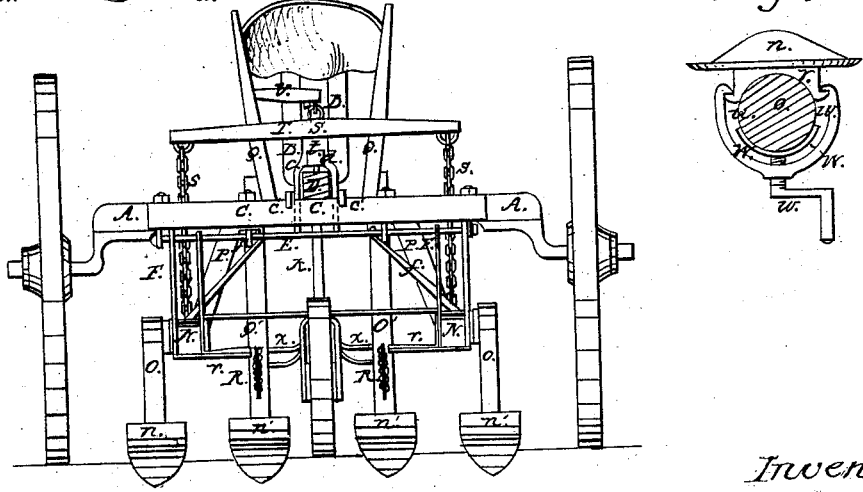
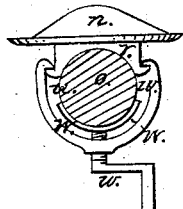

UNITED STATES PATENT OFFICE.

WILLIAM T. ROGERS, OF QUINCY, ILLINOIS.

IMPROVEMENT IN GANG-PLOWS.

Specification forming part of Letters Patent No. 56,613, dated July 24, 1866.

*To all whom it may concern:*

Be it known that I, WILLIAM T. ROGERS, of Quincy, in the county of Adams and State of Illinois, have invented certain new and useful Improvements in Agricultural Implements; and I do hereby declare the following to be a full, clear, and exact description thereof, reference being had to the accompanying drawings, which make part of this specification, and in which—

Figure 1:
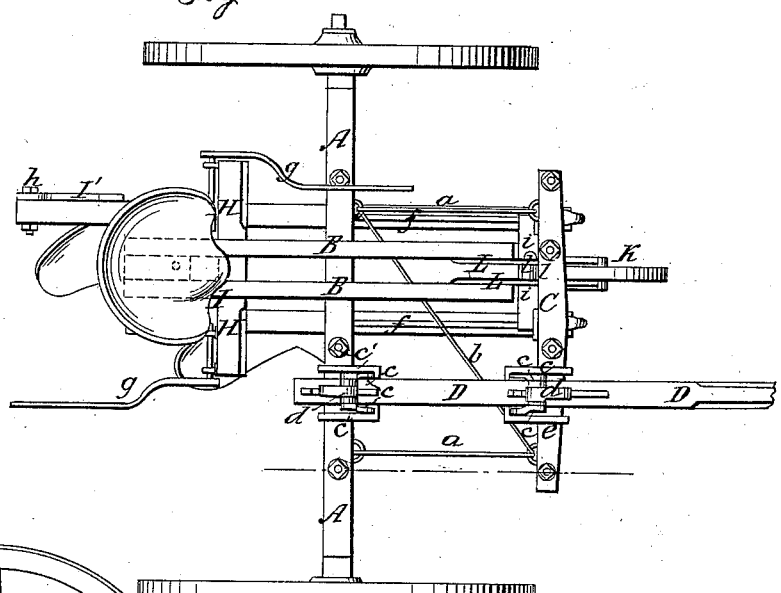
Figure 2:
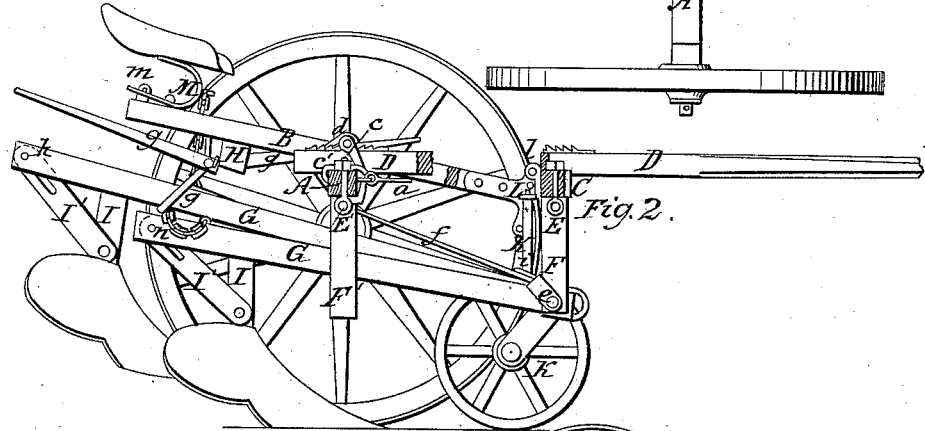
Figure 3:
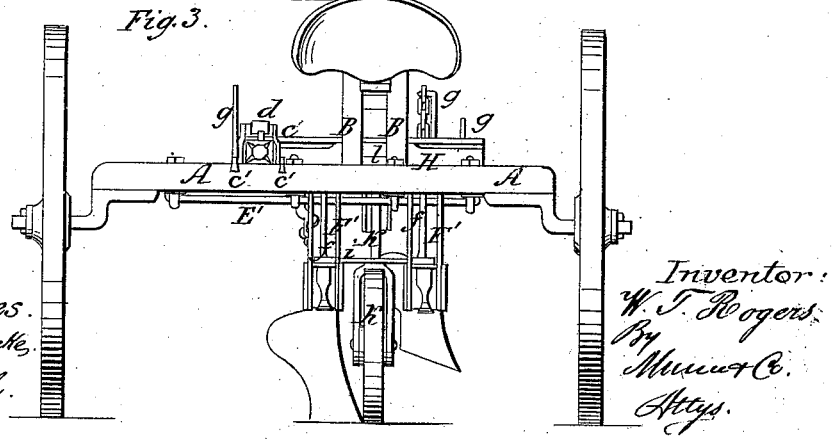

Figure 1 is a plan or top view of an implement used as a gang-plow. Fig. 2 is a section and elevation of the same on the line I I, Fig. 1. Fig. 3 is a front elevation of the same. Fig. 4 is a plan or top view of the same implement used as a cultivator. Fig. 5 is a section and elevation on the line II II, Fig. 4. Fig. 6 is a front elevation of the same; and Fig. 7 is a cross-section of one of the cultivator-shovel staffs, showing the manner of attaching the shovel to the staff.

In all the figures like parts are indicated by the same letters of reference.

The nature of my improvements consists in so arranging a gang of plows on a carriage that they may be adjusted to plow deep or shallow, to the plant or from it, and at the same time be easily unshipped, so that cultivator-shovels may be substituted for plows, which shovels are also arranged to be adjustable, so as to throw the earth in any direction.

A is the axle-tree; B B, the seat-bars, resting on the axle-tree as a fulcrum, and kept from moving laterally by a boss or projection on the axle-tree between them and extending along the axle the whole distance between the seat-bars.

C is the front cross-bar, connected to the axle-tree by the rods $a$ $a$ and diagonal brace $b$, Fig. 1.

The tongue D is secured upon the axle-tree A and the front cross-bar, C, by bolts, or by the clamps $c$ $c'$ and eccentric cams $d$ $d$, racks on the upper face of the tongue, where it crosses the axle and cross-bar, receiving in their notches the teeth of the eccentric cams $d$, to keep them from working up and loosening.

Rods E E' extend lengthwise along the under side of the axle-tree A and front cross-bar, C, on which are suspended the hangers F F and beam-guides F' F'. The rods E E' are secured in their places by eyebolts, through which their ends pass, and which extend up through the axle-tree and cross-bar, and are kept tight by nuts on the top. The bolts that hold the rods E E' near the middle of the axle and cross-bar are merely hooked at their lower ends, the shanks forming screw-bolts to be tightened by nuts, like the eyebolts, while the short limbs of the hooks enter sockets in the under side of the axle and cross-bar, the hangers and braces by this means having their upper ends jammed tightly against the under side of the axle and cross-bar without any possible chance to work loose.

The plow-beams G G have their front ends secured by bolts $e$ $e$, Fig. 2, passing through them and through the hangers F, within which the ends of the beams rest, and their front ends, moreover, are maintained in a constant position, and the hangers kept from vibrating back or forward by the braces $f$ $f$, which extend from the rod E, which passes through them under the axle-tree between the guides F F' to the bottom of the hangers F, which they embrace by yokes on their front ends, and are held by the same bolts that keep the plow-beams in the hangers, the bolt-holes in the ends of the yokes being slotted to allow for the varied inclination of the beams G.

The guides F' F' prevent lateral play of the plow-beams G G, while at the same time the beams can be lifted up or down in the guides, swinging on the bolts $f$ $f$ as fulcrums, by means of the levers $g$ $g$, with chains or links vibrating in bearings on the cross-piece H of the seat-bars B, and within reach and under the control of the driver on the seat.

The plow-standards I vibrate on the joints by which they are connected to the beams G, and are braced to the beams by the braces I'. These braces have slots at their upper ends, through which the bolts $h$ pass that hold them to the beams, so that they may be set long or short, turning the points of the plows more or less down, as required.

Notches are made in the faces of the braces on each side of the slots, into which the heads of the bolts $h$ will sink when they are set and tightened, so as to prevent any slipping of the brace upon the bolt.

A cross-bar, $i$, Figs. 1, 2, and 3, is secured upon the hanger-braces $f$ $f$, near their front ends or yokes, and just behind the hanger F, through which passes vertically the stem or spindle $k$ of the caster-wheel K, intended to relieve the horses from the weight of the tongue when gang-plows are used, the spindle extending up into and being steadied by the socket $l$, attached to the back side of the front cross-bar, C.

The front ends of the seat-bars B B have clevises L, which embrace the socket $l$ between them, and are secured to it by a bolt which passes through both clevises and socket. (See Figs. 1 and 2.)

The seat is fixed upon the seat-bars by the rocker M, which has a single bolt securing it to the seat-bars in such a manner that while it cannot slip back or forward it can oscillate, a slot in the back end of the rocker receiving a standard, $m$, on which the rocker may be fixed by two pins, one above and one below the rocker, the seat thus being made adjustable to suit the inclination of the seat-bars, as determined by the condition of the clevises L.

When it is deemed expedient to use the implement as a cultivator the cross-bar $i$ is removed from the hanger-braces $ff$, and the use of caster-wheel is dispensed with.

The plow-beams G are unshipped by drawing the bolts $e$, that hold them in the hangers F and the yokes of the braces $ff$, when, after unhooking the chains or links depending from the levers and cranks $g$, they may be taken entirely away and the cultivator-beams placed in their stead.

The front ends of the cultivator-beams N N are secured in the hangers F and between the yokes of the hanger-braces $ff$ in the same manner as were the plow-beams, the hooked eyebolts being loosened to allow the hangers F and guides F' to be moved along without taking them entirely off the rods E and E', under the axle-tree and front cross-bar, C, to positions to suit the arrangement of the cultivator-beams. The tongue D is also moved so as to extend toward the seat along the space between the seat-bars B, which space it fills, and in which it is secured, by the clamp $c$ and eccentric $d$, to the axle-tree and to the front cross-bar, C, as shown distinctly in Figs. 4, 5, and 6, the clevises on the ends of the seat-bars B being disconnected with the socket $l$, and made to embrace the tongue between them, where it is held by the same bolt that passed through the socket $l$ when the plows were used.

It will be seen that by keeping the guides F' F' in one position, and at the same time shifting the hangers F and their braces $ff$ along the rod E under the front cross-bar, C, the cultivator or plow beams may be kept parallel, or made to diverge or converge, as required, thus giving any action to the shovels or plows that may be necessary.

The inner sides of the hangers and guides are beveled from the center toward the outer edges, so that the beams may always fill the space and be kept steady laterally in the hangers and guides, whether the beams are parallel or oblique to each other.

The beams N N of the cultivators have securely attached to them at their rear ends by a joint, the staffs O O of the shovels $n\ n$. Braces $o\ o$ connect the staffs O O with the beams N, forming a triangular stay between each staff and beam, and are adjustable on the beams, by eyes or slots in the braces and bolts with nuts that pass through both braces and beams, in the same manner as that in which the plow-standards were secured upon their beams.

On the beams N N are firmly attached uprights P P, having at their upper ends swivel-joints $p\ p$, (see Figs. 4 and 5,) by which the staffs O' O' of the inner shovels, $n'\ n'$, are attached to them. The swivel-joints $p\ p$ are so constructed as that, while the beams N N are so set as to cause their shovels $n\ n$ to throw the soil in any one direction, the shovels $n'\ n'$ may be made to throw the soil in a contrary direction, or be lifted entirely clear of the surface. To this end handles, Q Q, connected by an adjustable rod or brace, $q$, Fig. 5, are firmly attached to the heads of the staffs O' O', and extending upward on each side of the driver and under his control. The staffs O' O' of the inner shovels are also connected to the front ends of the beams N N by chains or links R R, attached at their lower ends to the staffs O' O', near the shovels, and at their upper ends to braces $r\ r$, so arranged as to be adjustable laterally, as shown distinctly in Fig. 4. This is for the purpose of allowing each inner and outer shovel attached to the same beam N, and taken as a pair, to throw the soil to or from each other, and to cause the shovel-staffs O' O' to diverge or converge while their upper and rear ends are kept constant by the connecting-brace $q$, between the handles Q Q.

Chains or links $s\ s$ extend from the beams N N up, and are attached to the ends of a connecting-bar, T. Hooked to the middle of this bar T is a lever, U, having its fulcrum at $s$ on the upright $t$, attached by bolts to the rear end of the tongue, (see Figs. 4 and 5,) the lever extending back obliquely by the seat, so as to be under the control of the driver. The office of this lever is to lift the beams N N, so that all the shovels may be made to clear the surface of the ground when necessary, as in traveling along the road or in shifting from one field to another, &c.

Brackets $x$ are placed on the inside of the staffs O' O', above the shovels $n'\ n'$, by which the shovels can be forced into the soil, when necessary, by pressure from the driver's foot.

The shovels are secured upon their staffs in a manner peculiarly my own. The staffs, or that portion of them to which the shovels are attached, is circular or oval in cross-section. (See Fig. 7, which gives a vertical view of a shovel, looking down upon it from above.) To the back of the blade of the shovel, and forming one piece with it, is a shoe, V, (see Figs. 5 and 7,) concave on its back to suit the form of the staff. Ledges $u\ u$ extend along the edges of this shoe, which are grasped by the hooks of a clamp, W. Through the center of the arch which clamp forms passes the set-screw $w$, pressing against the concave plate X, which is between its end and the back of the staff O of the shovel. The screw may have a wrench-head, or be furnished with a small crank for immediate convenience, as shown in the drawings.

Having thus fully described my invention, what I claim as new therein, and desire to secure by Letters Patent, is—

1. The manner, as hereinbefore set forth, of securing gang-plow or cultivator beams upon a carriage that can be used to support either or both by means of the hangers F, guides F', and braces $f\,f$, or their equivalents, in combination with the rods E E', arranged and operating substantially as and for the purpose described.

2. The seat-bars B, with their clevises L, or an equivalent, in combination with the manner, as hereinbefore set forth, of regulating the seat to suit the inclination of the bars by means of the rocker M and adjusting-standard $m$, with supporting and locking pins, or their equivalents.

WM. T. ROGERS.

Witnesses:
 JOHN TORRENCE,
 T. M. ROGERS.